April 3, 1945.  D. G. TAYLOR  2,372,865
FILTER
Filed Aug. 7, 1942
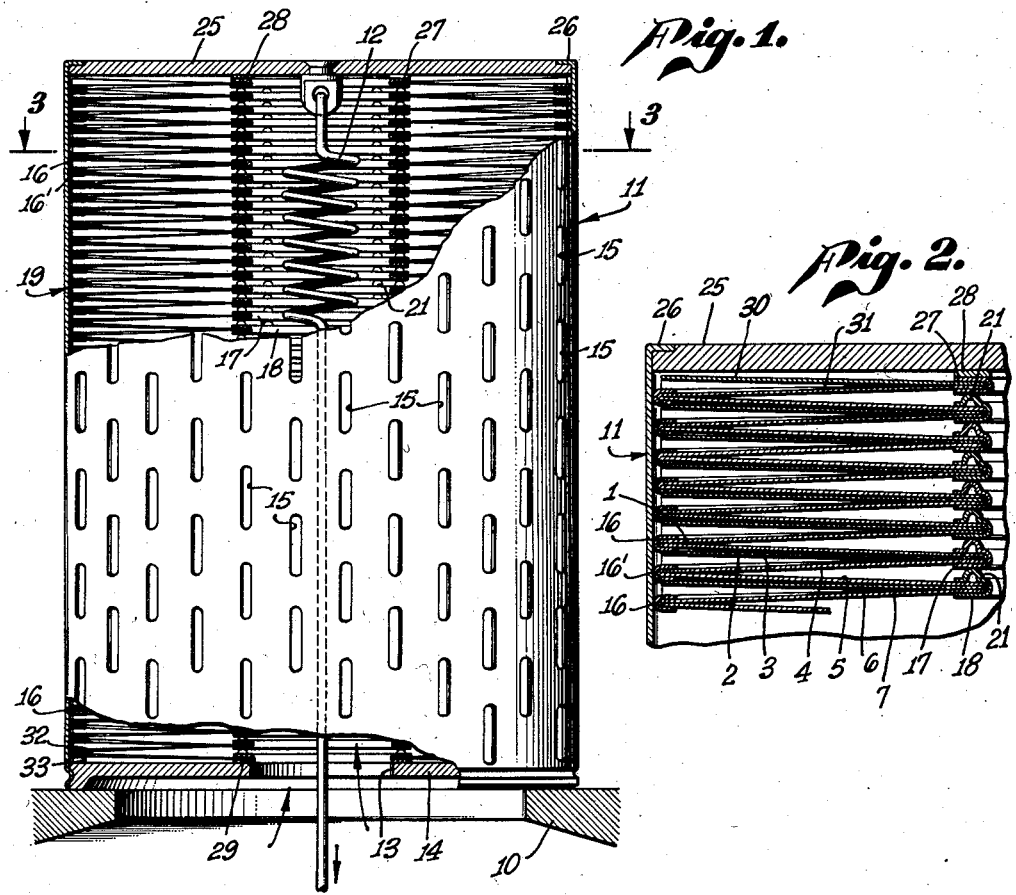
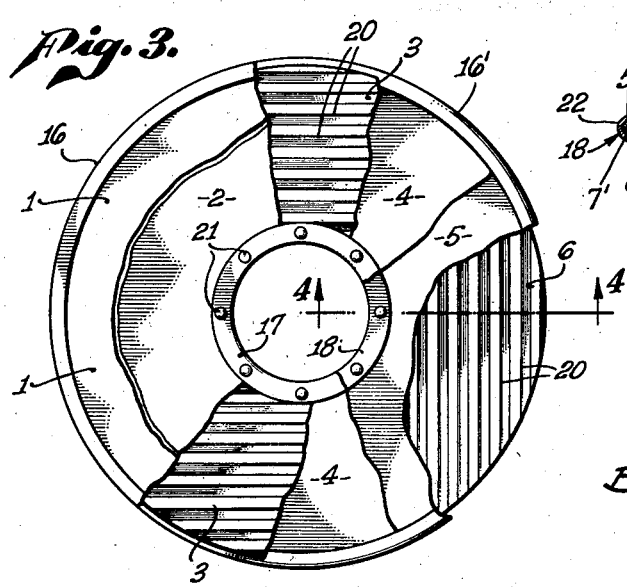
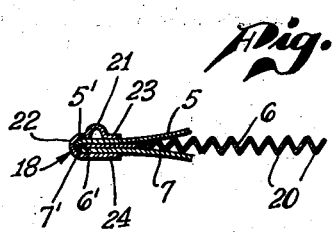
DELL G. TAYLOR,
INVENTOR,
BY W. L. Beatty
ATTORNEY.

Patented Apr. 3, 1945

2,372,865

UNITED STATES PATENT OFFICE 2,372,865

FILTER

Dell G. Taylor, Los Angeles, Calif., assignor of one-half to Albert W. Tondreau, Los Angeles, Calif.

Application August 7, 1942, Serial No. 453,956

10 Claims. (Cl. 210—169)

The invention relates to a filter of general application for filtering liquids, and particularly adapted for filtering oil or other liquids used in aircraft and the aircraft industries.

An object of the invention is to increase the filtering surface within a given space.

Another object of the invention is to obtain uniformity of distribution of the oil being filtered over the filter surfaces.

Another object of the invention is to improve the support for the filter medium.

Another object of the invention is to increase the filtering capacity of a filter and to increase its ability to withstand high pressure of the fluid to be filtered.

It has heretofore been proposed to provide certain types of filters wherein filter elements are individually mounted on and removable from a central tubular stem. As distinguished therefrom, the present invention provides a simple arrangement for assembling a plurality of filter discs as a unit by the means which seals the inner and outer edges of the filter discs and without the use of a central tubular stem.

The invention further relates to the following novel elements, separately or in combination; the use of inner and outer grommets or sealing rings for sealing the inner and outer edges of the filter discs, the means for slightly separating the inner rings to provide compactness and increased filter surface, the means for slightly separating the outer rings for compactness and increased filter surface, and a novel construction of inner rings which aside from sealing the inner edges of a pair of filter discs, also performs the functions spacing the inner rings apart while retaining the means for spacing the outer rings apart, and the use of a casing for housing the filter medium.

A further object of the invention is to secure a plurality of filter discs as a unit by the means which seals the inner and outer edges of the filter discs.

For further details of the invention, reference may be made to the drawing wherein Fig. 1 is a view in elevation, partly in section, and with parts broken away, of a filter according to the present invention.

Fig. 2 is an enlarged vertical sectional view, with parts broken away of the filter of Fig. 1.

Fig. 3 is a sectional view, with parts broken away, on line 3—3 of Fig. 1 looking in the direction of the arrows.

Fig. 4 is an enlarged sectional view, with parts broken away, on line 4—4 of Fig. 3 looking in the direction of the arrows.

Referring in detail to the drawing, it has heretofore been proposed to provide in the sump tank of a hydraulic system, a spring pressed filter which may act as a relief valve when the oil pressure is excessive. According to my invention, on a valve seat 10 I provide a filter casing 11 resiliently held on seat 10 by a spring 12 arranged coaxial inside of the casing 11. The oil enters a central aperture 13 in the bottom 14 of the casing 11, and after being filtered by a filter medium inside of casing 11, emerges through a plurality of outlets 15 which are circumferentially and longitudinally spaced on the casing 11. If the oil pressure at the inlet 13 exceeds a safe amount, such pressure overcomes the spring 12, raises the bottom 14 (acting as a valve head), from the seat 10 and permits the oil to momentarily bypass the casing 11 by passing along the bottom of the casing 11, until the oil pressure reaches normal when the casing 11 sets again as shown in Fig. 1, on valve seat 10 and the normal operation of the filter proceeds.

The present invention relates to the casing for the filter and to improvements in the filter employed in the casing 11, with various objects in mind as before stated.

The present invention provides a plurality of similar filter discs, usually of paper, as indicated at 1, 2, 4 and 5 of Fig. 3, and 5 and 7 in Fig. 4. As illustrated, each of these discs is circular and has a central aperture about the same size as the inlet 13.

According to the invention, I seal the outer edges of filter discs such as 1, 2, together in pairs such as 1—2, 4—5, by means of outer grommets, or sealing and clamping rings such as 16, 16' and with inner grommets, or sealing and clamping rings such as 17, I seal the inner edges of adjacent filter elements such as 2 and 4 of such pairs. Referring to Fig. 3, the outer edges of a pair of adjacent filter discs 1 and 2 are sealed by the grommet or outer ring 16, the outer edges of the next pair of filter elements 4 and 5 being sealed by a similar grommet or outer ring 16', enough pairs of filter elements such as 1—2 and 4—5 being employed to provide a stack 19 of filter elements sufficiently high to fill the inside of casing 11 as shown in Fig. 1. The filter stack 19 also includes a plurality of similar spacer discs such as indicated at 3 and 6 in Figs. 3 and 4. These spacer discs have an outside diameter and a central aperture substantially the same size as the filter discs such as 1 and 2. The spacer discs such as 3 and 6 may be of impregnated paper so that it will be rather stiff and it is preferably provided with parallel corrugations as indicated at 20.

The grommet or inner ring 17 in Fig. 3 seals the inner edges of the adjacent filter discs 2 and 4 of the two successive pairs 1—2 and 4—5, with the spacer disc 3 therebetween. This is illustrated in Fig. 4 which shows the next lower inner ring or grommet 18 securing the inner edge of the filter disc 5 and the adjacent filter element from the next pair, namely No. 7, with the spacer disc 6 interleaved therebetween. In like manner, each inner ring or grommet such as 18 seals the inner edges of the adjacent ones of two adjoining pairs of filter discs, with a spacer disc interleaved therebetween, the result being to associate the filter discs such as 1 and 2 and the spacer discs 3 together with an accordion type pleat, as a unit. To further illustrate this, if the top of the filter stack 19 is held in the hand, before putting the filter stack 19 in the casing 11, and without supporting the bottom of the filter stack 19, the latter will elongate, due to its own weight, to an extent which is approximately five or six times the length of the casing 11. The stack 19 may thus be expanded and contracted like an accordion, and this feature is useful as the filter stack in its extended position may be immersed in distillate to clean it, although for certain uses this feature may not be particularly important as the filter of this invention has a life sufficiently long to justify throwing it away and renewing it with a complete unit. The above explanation of the matter is made particularly to emphasize the fact that the outer rings such as 16 and the inner rings such as 17 not only seal the adjacent edges of the filter elements in staggered pairs, but also serve as the means which secures the filter elements such as 1 and 2 and the separators such as 3 together as a unitary structure.

One side of the pleats of the stack 19 serve as an inlet and the other side as an outlet, for the fluid to be filtered. The corrugations 20 in the separators such as 3, of course provide channels through which the filtered oil passes to the outlets 15. As shown in Fig. 2, the spacer discs 3, 30 may be shorter than the outer rings 16 so that the filtrate will flow around the inside wall of casing 11 until it finds one of the outlets 15. In order to space the outer grommets or rings such as 16 and 16' apart slightly, while providing a compact structure, as before stated, I make the diameter of the separator discs such as 3 substantially the same as the diameter of filter discs 1 and 2 whereby the periphery of the separator disc 3 extends between and in contact with the adjacent outer rings 16 and 16', to slightly space them apart. As the corrugations 20 have a slight weakness at the point in the periphery where they lie parallel to the periphery of rings 16, 16', and whereas they have greater strength at the point in the periphery where the corrugations 20 are at right angles to the outer rings 16 and 16', preferably I assemble the filter stack 19 with adjacent separator discs 3 and 6 having their corrugations such as 20, 20' extending at right angles to each other as shown at Fig. 3.

In order to slightly space the inner rings such as 17 and 18 apart, on one end of the inner rings such as 17, I provide spaced bosses or projections 21 which serve as supports for the smooth end of the adjacent inner ring. Preferably the inner ring such as 17 and the outer ring such as 16 are of aluminum, in which case the projections 21 may be formed by stamping. If desired, other materials may be employed for the rings 16, 17.

As shown in Fig. 4 the inner rings such as 18 are U shaped in cross section and each has an axial portion 22, namely the bight of the U which extends across the inner edge 5' of the filter disc 5 and the edge 7' of the filter disc 7 and the edge 6' of the separator disc 6. The inner rings such as 18 also have radial portions 23 and 24 which clamp the outside surfaces of the filters 5 and 7 with the separator 6 therebetween.

The filter stack 19 may be assembled in the casing 11 by inserting it therein as a unit, supported on the bottom 14 and then the top 25 is locked to the casing 11, for example by turning over the top edge of the casing 11 as shown at 26, although a removable lock may be employed if desired. The top inner ring 27 of the stack as shown in Fig. 1, need have no upper filter element, but only a separator 30 on top of a filter disc 31 and its top surface is preferably flat so as to make sealing contact with a washer 28 which lies between the ring 27 and the underside of the top 25. Similarly the bottom inner ring 29 need have no bottom filter element, but only a filter disc 32 on top of a separator 33 and it may rest on the bottom 4 or on a washer similar to 28.

The corrugations 20 are closely spaced to form a very effective and substantially uniform support for the filter discs 1, 2 etc. when they are subjected to the pressure of the fluid being filtered, whereby they will withstand a high pressure of the fluid being filtered. It is well-known that filter paper sags when it is wet with the fluid to be filtered, particularly when operating under pressure. Such sag is restrained not only by the inner or inlet rings 17, 18 which clamp the inner periphery of the filtered discs in pairs, and by the outlet rings such as 16, 16' which clamp the outer periphery of the filter discs in other pairs, but also by reason of the parallel array of corrugations 20. Even though the filter paper such as 2 and 4 should sag or be compressed against the separator such as 3 or 6, the corrugations 20 have a uniform depth, and a depth sufficient to prevent the paper from completely filling the corrugations when acting under pressure. If the corrugations 20 radiated out from the inlet ring 17, 18, such corrugations would be far apart at their outer periphery and close together at their inner periphery. If they were close enough at their outer periphery to prevent the filter paper from sagging, they would be so close together at their inner periphery that the sum total of the outlet passage through the troughs would be very small. With the use of parallel corrugations 20 however, it will be seen in Fig. 3 that the oil or the like in passing between two inlet rings 17, 18 and through the filter discs connected thereto, will find a large number of troughs uniform in size, in the right half and also in the left half of the particular separator disc such as 3. The filter element immediately below having corrugations 20 at right angles to the separator above it, will likewise provide a large number of troughs leading outwardly around the lower half of the separator held by ring 18 and an equal number of troughs leading outwardly from the upper half of the separator 6 held by that ring 18. Hence the corrugations 20 provide multiple outlets for the filtered fluid throughout practically the whole area of the filter discs such as 5 and 7, and between the outlet rings 16, 16'. Also, as the filter discs such as 1 and 2, the spacers such as 3 and the inner and outer rings such as 16 and 17 which constitute substantially all the elements of the filter stack 19, are exceedingly light in weight, it follows that the stack 19 is very light in weight.

As above stated, the filter stack 19, by itself and apart from any casing or means for supporting it, may be expanded or stretched and contracted along its length like an accordion. This is due to the accordion type pleat assembly of the discs 1, 2 etc. and separators 3 by the rings 16, 17 etc., and due partly to the fact that the discs 1, 2 etc. are flexible and have in effect a hinge connection with or permit hinge movement with the outer and inner rings 16, 17 etc. Thus the over-all length of the filter stack 19 may be readily varied as it is flexible lengthwise as a unit. If the filter stack 19 is flexed lengthwise, the inner rings 17, 18 etc. will be spaced apart. This feature of flexibility may be of advantage in certain situations, but for other situations the arrangement of Figs. 1 and 2 is preferred, wherein the filter discs 1, 2 etc. and separators 3 etc. are stacked one on top of the other in a compact unit, affording a large filtering surface for a given space.

It will be apparent that various modifications may be made in the invention without departing from the spirit of the following claims.

I claim:

1. A filter element comprising a stack of filter discs each having a central aperture and separators interleaved therewith, and means for securing said filter discs and separators as a unit, said means comprising inner grommets securing the inner edges of successive pairs of said filter discs with a separator interleaved with each pair thereof, and outer grommets securing the outer edges of a filter disc of one of said pairs and an adjoining filter disc of another pair, means for spacing said inner grommets apart to provide a fluid passage, and means for spacing said outer grommets apart to provide a fluid passage.

2. A filter element according to claim 1 wherein said means providing a fluid passage between certain of said grommets comprises a stack of corrugated impregnated paper discs each extending between adjacent ones of said certain grommets and secured by others of said grommets.

3. A filter comprising filter discs having a central aperture, grommets securing certain edges of said discs in pairs, said pairs of discs having a space therebetween serving as an outlet for filtered fluid, and means opposing reduction of said space due to pressure of the fluid to be filtered, said means comprising a set of rigid spacer discs each supporting on its opposite sides the adjacent filter discs of two adjoining pairs of said filter discs and also supporting the grommets of those adjoining pairs of said filter discs.

4. A filter element comprising a stack of filter discs each having a central aperture and disc spacers interleaved therewith, each of said disc spacers having rigid corrugations, and means for securing said filter discs and spacers as a unit, said means comprising a set of inner grommets each sealing the inner edges of a pair of said filter discs, and a set of outer grommets each sealing the outer edges of a filter disc of one pair and a filter disc of another pair, projections on one side of each grommet in one of said sets of grommets for spacing the same apart to provide a fluid passage, each grommet of said last mentioned set of grommets securing one of said spacers between the pair of filter discs secured by that grommet, each of said spacers having corrugations extending between and supporting an adjacent pair of the grommets in the other of said set of grommets to provide a fluid passage.

5. A filter element according to claim 4 wherein the corrugations on each of said disc spacers are parallel, with the corrugations of one spacer crossed with the corrugations of another spacer.

6. A filter element comprising a stack of filter discs with a rigid corrugated disc spacer between each pair of said filter discs, means for sealing the inner edges of each adjacent pair of said filter discs with one of said disc spacers therebetween, said means comprising a plurality of grommets each extending across the inner edges of a pair of said filter discs and across the inner edge of one of said spacers, each of said grommets clamping the outside surfaces of a pair of filter discs with one of said spacers interleaved therewith, and circumferentially spaced axially extending projections on one end of each of said grommets adapted to contact an adjacent one of said grommets to provide a fluid passage, means sealing the outer edges of said discs in other pairs to form a filter surface of accordion type pleats and means providing a fluid passage between said sealing means for said other disc pairs.

7. A filter stack comprising a filter medium in the form of accordion pleats having outer edges and having inner edges around a central aperture, a set of inner grommets clamping the inner edges of said pleats and a set of outer grommets clamping the outer edges of said pleats, and all of said grommets connecting said pleats into a substantially continuous pleated surface having an inlet side and an outlet side thereof, said spacers having inner and outer edges and a central aperture, each of said grommets of one of said sets clamping an edge of one of said spacers between the edges of said pleats clamped by that grommet, and means positioned between the grommets of said other set and supporting the same apart substantially the height of said corrugations.

8. A filter stack according to claim 7 wherein the corrugations of each of said spacers extend over and support substantially the whole of the active surface of the sides of the pleats adjacent such spacers, the corrugations of certain of said spacers crossing the corrugations of the spacers on each side thereof.

9. A filter comprising a casing having end walls and a side wall, one of said end walls having a central aperture and said side wall having an array of staggered apertures, a filter element having an active surface in the form of an accordion type pleat extending substantially from one of said end walls to the other end wall and having a central fluid passage communicating with said aperture in said end wall, said accordion pleat having inner edges and outer edges, a set of outer grommets substantially fitting the inside of said casing and extending from one of said end walls to the other thereof, each of said grommets clamping one of the outer edges of said pleat with means between and spacing said grommets apart to provide a fluid passage, a set of inner grommets extending from one of said end walls to the other thereof, each of said last mentioned grommets sealing an inner edge of said pleat, means between and supporting said last mentioned grommets apart to provide a fluid passage, and spacers having parallel corrugations extending between and supporting said pleats, each of the grommets of one of said sets clamping one of said spacers.

10. A filter comprising a casing having end walls and a side wall, a stack of outer grommets and intervening spacers extending from one of said end walls to the other, a stack of inner grommets and intervening spacers extending from one of said end walls to the other, a filter medium in the form of accordion pleats secured by said grommets, spacers between adjacent pleats and held in position by one of said stacks of grommets, said side wall having an array of apertures communicating with one side of said pleats, and one of said end wells having a central aperture communicating with the other side of said pleats.

DELL G. TAYLOR.